Patented Dec. 2, 1952

2,620,351

UNITED STATES PATENT OFFICE 2,620,351

TRIBENZOATES OF TRIALKYLOLAMINES

Isaac Croom Beatty, III, La Fayette, Ind.

No Drawing. Application November 8, 1951,
Serial No. 255,532

5 Claims. (Cl. 260—472)

This invention relates to nitrogen containing compounds and more specifically refers to compounds containing three anesthesiophore groups.

The field of anesthetics and particularly local anesthetics has been the subject of much and intensive research during the last half century. Much of the work has been done following the discovery of procaine.

The literature is filled with compounds synthesized for anesthetic investigation, but very few compounds have actually been developed and found suitable for medical use.

It is an object of the present invention to produce new and useful organic compounds. An additional object is to produce compounds having three anesthesiophore groups, which compounds are useful as local anesthetics.

These objects are attained in accordance with the present invention wherein there is produced a compound conforming to the general formula

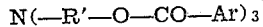

N(—R'—O—CO—Ar)₃ wherein Ar represents an aryl radical which may be further substituted; and R' represents a bivalent aliphatic hydrocarbon radical containing at least two carbon atoms.

In a more restricted sense, the invention is concerned with derivatives in which R' represents a bivalent ethane group and the Ar group is an amino substituted phenyl nucleus. Most of the compounds herein described may be produced in the form of hydrochlorides or other salts suitable for use as anesthetics or other purposes.

The invention is best described with reference to the following examples.

EXAMPLE 1

*Preparation of the tri p-aminobenzoate of triethanolamine*

Triethanolamine in the amount of 14.9 g. (0.1 mole) was dissolved in 225 ml. of water to which 15 g. (0.38 mole) of sodium hydroxide had been added. The solution was put in a 500 ml. flask equipped with a funnel, mechanical stirrer, and a thermometer. Finely divided p-nitrobenzoyl chloride was added at such a rate as to hold the temperature within the range of 35–40° C. The reaction was stirred until the temperature dropped below 35° C., which required approximately three hours. The granular, insoluble compound formed was filtered and washed with water until the wash water was neutral to hydrion paper. The compound was recrystallized from hot, absolute ethanol. The cream-colored crystals melted at 184.5° to 185.5° C. The yield was 71.0%.

The molecular weight determined was 586.8. The nitrogen analysis showed 9.43% nitrogen.

The nitro compound was then reduced in a hydrogenator at 60° C. and under a pressure of 60 p. s. i., using platinum oxide as a catalyst and ethanol as the solvent. The solvent was removed under reduced pressure. The yield was quantitative. The melting point was 72.5–73.0° C.

The amino compound was then put into benzene in the proportion of 2 g. per 1,000 ml. of benzene. Dry hydrogen chloride gas was bubbled into this solution and a white crystalline substance resulted. The yields were quantitative and from the weight of compound obtained, four molecules of hydrogen chloride reacted with one molecule of the amino compound. The melting point of the hydrochloride salt was 215.5° C.

EXAMPLE 2

*Preparation of the tri-m-aminobenzoate of triethanolamine*

In the manner as described before, 22.38 g. (0.15 mole) of tri-ethanolamine were reacted with 83.5 g. (0.45 mole) of m-nitrobenzoyl chloride in an alkaline solution of 250 ml. of water and 22 g. (0.55 mole) of sodium hydroxide. The resulting compound was recrystallized from ethanol. The yield was 91.0%, the molecular weight 593.0, the melting point 90.5–91.7° C., and the nitrogen analysis showed 9.36% nitrogen.

The nitro compound was reduced quantitatively by the method described before. The melting point was 74.0–75.5° C. The molecular weight was 506.45 and the nitrogen content 11.06%.

The amino compound was dissolved in ether, 2 g. of the amino compound per liter of ether. Dry hydrogen chloride gas was added and a pink-white crystalline compound resulted. The yield was quantitative. The weight of salt obtained indicated four molecules of the hydrogen chloride reacted with one molecule of the amine. The melting point was 153.5° C. (d).

EXAMPLE 3

*Preparation of the tribenzoate of triethanolamine*

In the prescribed manner 22.8 g. (0.15 mole) of triethanolamine were condensed with 63.3 g. (0.45 mole) of benzoyl chloride. The resulting ester was obtained in 66.5% yield. The white crystals melted at 147.5–148.0° C. The molecular weight was 463.5 and the nitrogen content was 3.25%.

The ester was then dissolved in ether in the proportion of 5 g. of the ester in 500 ml. of ether. A solution of dry hydrogen chloride in ether was added until no more precipitate formed. The solvent was then removed under reduced pressure. The yield of the hydrochloric salt obtained was quantitative and indicated that one molecule of hydrogen chloride had reacted with one molecule of the amine. The melting point was 154.5° C. (d).

EXAMPLE 4

*Preparation of the tribenzoate of triisopropanolamine*

The condensation was carried out as described before using 28.7 g. (0.15 mole) of triisopropanolamine and 63.3 g. (0.45 mole) of benzoyl chloride. The resulting ester was a red oil and was obtained in 87.6% yield. The molecular weight was 497.7, the nitrogen content 2.81%, and the decomposition point 197.5° C.

The oil was dissolved in ether in the proportion of 5 g. of oil to 500 ml. of ether. Hydrogen chloride in an ether solvent was added until no more precipitate formed. The hydrochloride obtained was a pink oil. The solvent was removed under pressure. The yield was quantitative and indicated that one molecule of hydrogen chloride reacted with one molecule of the amine. The decomposition point was 188.5° C.

The above compounds described in the form of their hydrochloride salts were tested for their anesthetic properties by using the anesthetics on fish.

Water solutions in the ratio of one part by weight of salt in 4,000 parts by weight of water were used. Goldfish were put into each of the solutions of the amino hydrochloride salts. The time for the fish to become quiet and the time required for complete anesthesia were recorded. This gave an indication of the speed of absorption of the drug. The fish was then placed in fresh water and the time required for normal movement to return was recorded. This gave an indication of the depth of anesthesia. Table A, which follows, shows the times recorded as contrasted to the times recorded for novocaine used as a standard.

TABLE A

*Physical properties of the hydrochloride salts*

| Salt [1] | Anesthetic effect | | | |
|---|---|---|---|---|
| | State of Sol.[2] | Time to Become Quiet | Time for Complete Anesthesia | Time to Revive |
| $N(CH_2CH_2O_2C\text{-}C_6H_4\text{-}NH_2)_3 \cdot 4HCl$ (v-d) | Cloudy (S) | 15 min. 20 sec. | 7 min. | 9 min. 40 sec. |
| $N(CH_2CH_2O_2C\text{-}C_6H_4(NH_2)_2)_3 \cdot 4HCl$ (v-d) | Clear (V-S) | 8 min. 40 sec. | Not complete in 70 min. | 1 min. 30 sec. |
| $N(CH_2CH_2O_2C\text{-}C_6H_5)_3 \cdot HCl$ (s-d) | Clear (S-S) | 11 min. | 23 min. 50 sec. | 5 min. |
| $N(CH_2CH(CH_3)O_2C\text{-}C_6H_5)_3 \cdot HCl$ (d) | Clear (V-S) | | 2 min. | 9 min. 55 sec. |
| Standard Novocaine $H_2N\text{-}C_6H_4\text{-}CO_2CH_2CH_2N(C_2H_5)_2$ | Clear (V-S) | 2 min. | 47 min. 50 sec. | 13 min. |

[1] (v-d)—very deliquescent; (d)—deliquescent; (s-d)—slightly deliquescent.
[2] V-S—very soluble; S—soluble; S-S—slightly soluble.

It will be noted from the above table that all the compounds disclosed exhibit anesthetic properties which favorably compare to novocaine.

In addition to the hydrochloride salts, other salts, such as oxalates and the like, may be employed. Derivatives of the basic compounds other than amino may also be used as described herein.

In addition to the anesthetic utility of the new compounds the latter may be employed as plasticizers for resins, dielectric materials, as intermediates for further chemical reaction, etc.

The preferred compound is the triamino benzoate of triisopropanol amine and the same compound with the amino substitution.

As many widely different embodiments of this invention may be made without departing from the spirit and scope thereof, it is to be understood that the invention is not limited to the specific embodiments herein described except as defined in the appended claims.

What is claimed is:

1. A compound conforming to the general formula

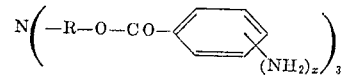

wherein $x$ is an integer from 0 to 1 and R is the bivalent hydrocarbon radical selected from the class containing ethene and isopropene radicals.

2. A local anesthetic comprising a hydrochloride salt of a compound of claim 1.
3. The tri p-aminobenzoate of triethanolamine.
4. The tri-benzoate of triethanolamine.
5. The tri-benzoate of triisopropanolamine.

ISAAC CROOM BEATTY, III.

No references cited.